United States Patent
Sugiyama et al.

(10) Patent No.: US 7,699,568 B2
(45) Date of Patent: Apr. 20, 2010

(54) SCREW ATTACHMENT, FASTENING ASSEMBLY HAVING SCREW ATTACHMENT, AND PROCESS OF RELEASING FASTENING ASSEMBLY

(75) Inventors: Kazuo Sugiyama, Kanagawa (JP); Tadashi Tashima, Kanagawa (JP); Kazunari Yoshida, Kanagawa (JP); Yu Kagami, Miyagi (JP); Hideo Takaara, Miyagi (JP); Yoshio Shindoh, Osaka (JP); Masanobu Tanigawa, Osaka (JP)

(73) Assignees: Union Seimitsu Co. Ltd, Kanagawa (JP); NEC Tokin Corporation, Miyagi (JP); Sharp Kabushiki Kaisha, Osaka (JP); Tokai University Educational System, Tokyo (JP)

( * ) Notice: Subject to any disclaimer, the term of this patent is extended or adjusted under 35 U.S.C. 154(b) by 0 days.

(21) Appl. No.: 10/851,183

(22) Filed: May 24, 2004

(65) Prior Publication Data

US 2004/0247386 A1    Dec. 9, 2004

(30) Foreign Application Priority Data

Jun. 4, 2003  (JP) .............................. 2003-159183
Feb. 5, 2004  (JP) .............................. 2004-028967

(51) Int. Cl.
F16B 37/04    (2006.01)
F16B 21/18    (2006.01)
F16B 43/02    (2006.01)

(52) U.S. Cl. ...................... 411/82.5; 411/353; 411/517; 411/541

(58) Field of Classification Search ................. 411/518, 411/519, 353, 517, 104, 154, 541, 529, 82, 411/930, 539, 82.5

See application file for complete search history.

(56) References Cited

U.S. PATENT DOCUMENTS 265,538 A * 10/1882 Reid ............................ 238/24
591,193 A * 10/1897 Osgood ...................... 411/531

(Continued)

FOREIGN PATENT DOCUMENTS

EP        0 549 094 A1    6/1993

(Continued)

OTHER PUBLICATIONS http://products.asminternational.org/hbk/do/highlight/content/MH/D24?A08/index.html.*

*Primary Examiner*—Victor Batson
*Assistant Examiner*—David C Reese
(74) *Attorney, Agent, or Firm*—Birch, Stewart, Kolasch & Birch, LLP.

(57) ABSTRACT

A screw attachment (10, 10', 10") disposed around a fastening piece (17) secured to a main fastening body (25a), the screw attachment sandwiched between a head (17b) of the fastening piece and a securing object (22) so that the screw attachment bears a securing force of the fastening piece to press the securing object. The screw attachment includes a pair of arms (12, 13) made of a shape restoring material. Each arm has a fore end, and the fore ends are joined to each other with an adhesive material that is softened when heated. The arms expands radially such that the screw attachment is released from the head of the fastening piece when heat or force is applied to the arms.

2 Claims, 9 Drawing Sheets

U.S. PATENT DOCUMENTS

| | | | | |
|---|---|---|---|---|
| 1,392,242 | A | * | 9/1921 | Albergoli ................. 297/445.1 |
| 1,671,757 | A | * | 5/1928 | Allen ......................... 411/104 |
| 2,476,586 | A | * | 7/1949 | Darash ....................... 411/519 |
| 2,789,457 | A | * | 4/1957 | Allen ......................... 411/432 |
| 3,752,515 | A | * | 8/1973 | Oaks et al. ................. 403/344 |
| 3,803,793 | A | * | 4/1974 | Dahl ....................... 403/408.1 |
| 3,812,756 | A | * | 5/1974 | Wenger ..................... 411/353 |
| 4,450,616 | A | * | 5/1984 | Morita ........................ 29/446 |
| 4,501,058 | A | * | 2/1985 | Schutzler .................... 29/446 |
| 4,636,124 | A | * | 1/1987 | Gugle et al. ............... 411/82.3 |
| 4,657,460 | A | * | 4/1987 | Bien .......................... 411/258 |
| 4,881,860 | A | * | 11/1989 | Kanazawa .................. 411/55 |
| 4,899,543 | A | * | 2/1990 | Romanelli et al. ............ 60/527 |
| 5,037,258 | A | * | 8/1991 | Heurteux .................... 411/104 |
| 5,593,120 | A | * | 1/1997 | Hamerski ................ 248/205.3 |
| 5,772,378 | A | * | 6/1998 | Keto-Tokoi ................ 411/432 |
| 5,791,847 | A | * | 8/1998 | Keto-Tokoi ................ 411/368 |
| 5,833,776 | A | * | 11/1998 | Labesky ..................... 148/580 |
| 5,833,909 | A | * | 11/1998 | Chen et al. ............. 264/272.15 |
| 2001/0009169 | A1 | * | 7/2001 | Kajiwara et al. ............ 148/563 |
| 2001/0035236 | A1 | * | 11/2001 | Ishida et al. ................ 148/402 |
| 2002/0062547 | A1 | | 5/2002 | Chiodo et al. |
| 2002/0170669 | A1 | * | 11/2002 | Autterson et al. ........ 156/307.7 |

FOREIGN PATENT DOCUMENTS

| | | |
|---|---|---|
| EP | 1 245 306 A2 | 10/2002 |
| EP | 1 245 306 A3 | 10/2002 |
| JP | 61-20912 | 2/1986 |
| JP | 62-110013 | 5/1987 |
| JP | 2-36616 | 3/1990 |
| JP | 5-172299 A | 7/1993 |
| JP | 7-4407 | 1/1995 |
| JP | 2001-59512 | 3/2001 |
| JP | 2002-5124 A | 1/2002 |
| JP | 2003-65314 A | 3/2003 |
| JP | 2003-145564 A | 5/2003 |
| KR | 2002-0067134 | 8/2002 |

* cited by examiner

SCREW ATTACHMENT, FASTENING ASSEMBLY HAVING SCREW ATTACHMENT, AND PROCESS OF RELEASING FASTENING ASSEMBLY

BACKGROUND OF THE INVENTION

1. Field of the Invention

The present invention relates to a screw attachment, a fastening assembly having the screw attachment, and a process of releasing the fastening assembly, which are effectively applied to an instrument or machine which can be recycled such as an air conditioner, a refrigerator, a television, a battery pack, and a convenient charger.

2. Background Art

Recycling of electric appliances such as an air conditioner, a washing machine, and a refrigerator has been positively realized for reuse of natural resources in view of environmental preservation. However, it takes time to remove securing screws of the electric appliances. Thus, a recycling process with sufficient work efficiency has not been established yet.

Figure 16:
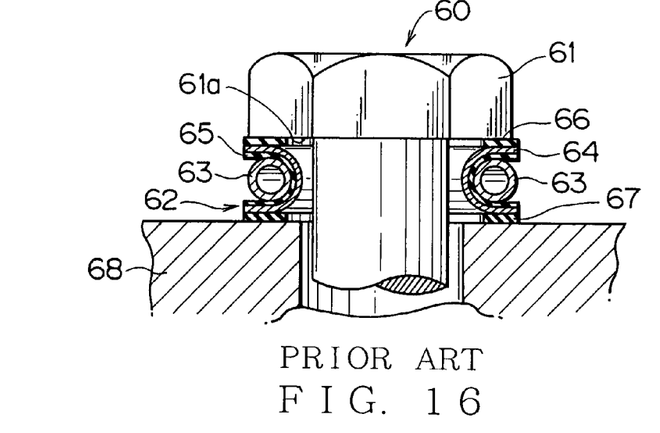
FIG. 16 is a side view partially in section for showing a conventional fastening piece utilizing a shape memory alloy.
Figure 17A:
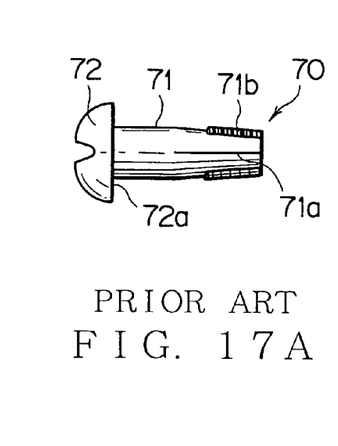
FIGS. 17A and 17B show another conventional fastening piece utilizing a shape memory alloy, FIG. 17A being a plan view in which the fastening piece is in an memorized shape, FIG. 17B being a view partially in section for showing an assembled state of the fastening piece.
Figure 17B:
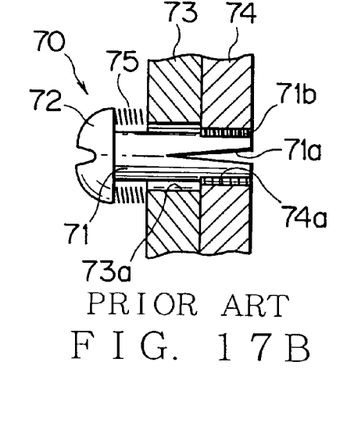
Figure 18:
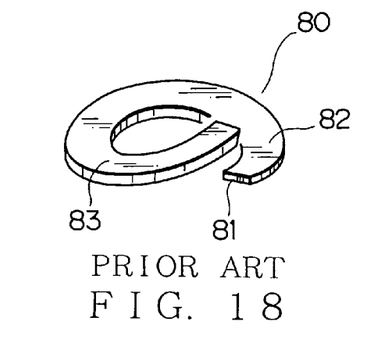
FIG. 18 is a perspective view showing a conventional screw attachment made of a shape memory alloy.

FIGS. 16 to 18 show examples of fastening pieces and screw attachments which are made of shape memory alloys. A first prior art as disclosed in Japanese Utility Model Laid-open No. H-2-36616 (particularly in Pages 4 to 6 and FIG. 5 of the prior art) shows a device for preventing looseness of a bolt 60 as well as for releasing the bolt 60 when necessary. As shown in FIG. 16, a washer 62 is provided as a screw attachment sandwiched between a head 61 of the bolt 60 and a fastened plate 68. The washer 62 consists of a first ring 63, a second ring 64, an insulator 65 layered between the rings 63 and 64, and a pair of annular insulating seats 66, 67 each disposed over or under the second ring 64. All the members align with one another in an axial direction of the bolt 60. The rings 63 and 64 each are made of a shape memory alloy. Heating the rings 63 and 64 above a temperature of reverse transformation expands the first ring 63 and contracts the second ring 64 vertically in FIG. 16 due to shape memory processes provided for the rings.

That is, the first ring 63 expands vertically above its reverse transformation temperature, so that a bearing surface 61a of the bolt 60 is pressed to increase contact pressure between threads of the bolt 60 and the fastened plate 68. This secures the bolt 60 to the fastened plate 68, preventing looseness of the bolt 60. The second ring 64 contracts vertically at its reverse transformation temperature and above, so that the bearing surface 61a of the bolt 60 is released from pressure to decrease contact pressure between the threads of the bolt 60 and the fastened plate 68. Thereby, the bolt 60 is brought in a loosened state. Accordingly, the first prior art provides the device to enable fastening and loosening of the bolt 60.

FIGS. 17A and 17B show a second prior art as disclosed in Japanese Patent Application Laid-open No. H-7-4407 (in FIGS. 5 and 12 of the prior art). The second prior art discloses a securing screw 70 to easily disassemble electric appliances for scraping. As shown in FIG. 17A, the screw 70 is made of a shape memory material and has a stem 71 and a head 72 contiguous with the stem 71. The stem 71 has a slit 71a at its fore end to divide the fore end in two parts. The two fore ends each have an outer periphery formed with a tapered surface. The tapered surface has threads 71b formed thereon.

FIG. 17A shows the stem 71 having a closed end which corresponds to a memorized shape, while FIG. 17B shows the stem 71 having an end open in a V-shape. The screw 70 is inserted through a through hole 73a of a fastened plate 73 and engages with an internal thread 74a of a main fastening body 74. A spring 75 is provided between a bearing surface 72a of the screw 70 and the fastened plate 73. A resilient force of the spring urges the screw 70 outward to release it from the main fastening body 74 when the screw 70 returns in its memorized shape.

FIG. 18 shows a third prior art as disclosed in Japanese Patent Application Laid-open No. S-62-110013 (in Page 2 and in FIG. 1 of the prior art). The third art discloses a resilient washer 80 as a screw attachment for preventing looseness of a bolt due to thermal expansion. The resilient washer 80 is made of a shape memory alloy having a shape restoring temperature of 5 to 10□. As shown in FIG. 18, the resilient washer 80 has a pair of arms 82, 83 with a cut-off part 81 therebetween. The arms are offset from each other due to a shape memory process.

The resilient washer 80 is formed in a flat shape at a temperature sufficiently lower than its shape transformation point, and the flat resilient washer 80 is sandwiched between the bolt and a securing object or between a nut and the securing object to contact them with a temperature lower than the shape transformation point. After fastening of the bolt, the resilient washer 80 returns in a memorized shape at a temperature higher than the shape transformation point, causing a tensile force in an axial direction of the bolt. This increases contact pressure between threads of the bolt and the securing object to provide a fastening force of the bolt.

In the third prior art, the return-back of the resilient washer 80 due to a shape memory function is larger than a thermal expansion of the bolt. This prevents looseness between the resilient washer 80 and the bolt with a fastening force regardless of the thermal expansion of the bolt.

Furthermore, another prior art described in Japanese Utility Model Laid-open No. H-4-113320 discloses a washer of a shape memory alloy, and Japanese Patent Application Laid-open NO. 2001-59512 discloses a construction of a washer.

However, the conventional fastening pieces and screw attachments described above have following disadvantages to be eliminated.

In the first prior art, the washer 62 is constituted by several parts to have a complex construction. Thus, the washer 62 is difficult in minimization not to be applied to a small screw. Furthermore, an automatic machine like a robot is employed to fasten screws with a given torque during an assembling step of an electric appliance. Therefore, a heating process after fastening of the screws to increase the fastening force like the first prior art will be disadvantageous in work efficiency for the assembling step. Such a heating process step will be difficult for obtaining a constant fastening force, decreasing productivity of the assembling step.

Moreover, the washer 62 can not be applied to a flush head screw broadly used for assembling electric appliances. Because, the washer 62 is applicable only for a screw or the bolt 60 having the bearing surface 61a perpendicular to an axial direction of the bolt.

The screw 70 of the second prior art has the stem 71 with the pair of branched tips to define a clearance therebetween. The branched tips decrease solidity of the screw 70 not to provide a sufficient fastening force. The screw 70 may be disadvantageously loosened due to vibration of the electric appliance. Furthermore, the screw 70 requires a thread formed thereon with a rotating dice, increasing an assembling cost of the electric appliance. Because, the threads need to have a specifically larger depth to keep a sufficient fastening force.

The washer of the third prior art provides an increased fastening force for a bolt to reliably assemble a plastic chassis of an electric appliance. On the contrary, the increased fastening force is disadvantageous when the bolt is removed during disassembling of the electric appliance.

In another prior art disclosed in Japanese Utility Model Laid-open No. H-4-113320, a fastening bolt has a seating surface perpendicular to an axial direction of the bolt. Thus, a strong fastening force provides a larger contact pressure on the searing surface. The larger contact pressure may undesirably prevent a washer form releasing from the bolt when the washer is heated for disassembling of an electric appliance.

In another prior art disclosed in Japanese Patent Application Laid-open NO. 2001-59512, a washer has a pair of arms and a connection piece for the arms. The connection piece forces into a head of a screw and an opposing object to stop turning of the screw to prevent loosening of the screw. Meanwhile, such a connection piece is undesirable for easily disassembling an electric appliance, because the screw having the connection piece is not easily removed.

SUMMARY OF THE INVENTION

In view of the aforementioned situation, an object of the invention is to provide a screw attachment, a fastening assembly having the screw attachment, and a process of releasing the fastening assembly, which are suitable for securing a fastening member to an opposing object with reliability and efficient work and also for removing or separating the fastening member from the opposing object with ease.

For achieving the object, a first aspect of the invention is a screw attachment disposed around a fastening piece secured to a main fastening body. The screw attachment is sandwiched between a head of the fastening piece and a securing object so that the screw attachment bears a securing force of the fastening piece to press the securing object. The screw attachment includes a pair of arms, and the arms has fore ends joined to each other with an adhesive material softened when heated. The arms are made of a shape restoring material. The arms expands radially such that the screw attachment is released from the head of the fastening piece.

Thus, the securing object is secured to the main fastening body via the screw attachment by the securing force of the fastening piece. Meanwhile, the connection portion of the screw attachment softens when heated, so that the pair of arms come away from each other to expand outward radially by its shape restoring function. Thereby, the screw attachment is released from the head of the fastening piece. Accordingly, in assembling of an electric appliance, the fastening piece can secure the securing object to the main fastening body with a normal fastening force. Meanwhile, in disassembling of the electric appliance, the fastening piece is easily loosened, saving time for a disassembling process. The screw may be a usual screw or a bolt for fastening, and the screw attachment includes parts generally having no threads and used together with the screw. The connection portion has a softening temperature lower than that of the arms. For example, the connection portion is a solder (Sn—Bi, or Sn—In) or a hot melt adhesive consisting of a polyurethane.

A second aspect of the invention is a screw attachment disposed around a fastening piece secured to a main fastening body. The screw attachment is sandwiched between a head of the fastening piece and a securing object so that the screw attachment bears a securing force of the fastening piece to press the securing object. The screw attachment is made of a shape restoring material, and the screw attachment has a pair of arms that can expand radially such that the screw attachment is released from the head of the fastening piece by heating or provision of an external force.

Thus, the securing object is secured to the main fastening body via the screw attachment by the securing force of the fastening piece. Meanwhile, the pair of arms return in original shapes against the securing force by heating or provision of an external force, so that the pair of arms come away form each other to expand outward radially. Thereby, the screw attachment is released from the head of the fastening piece. Accordingly, the screw attachment easily disengages from the fastening piece, providing an effective disassembling process. The shape restoring material may be a metal or a synthetic resin material to return to an original shape by heating. For example, the shape restoring material is a Ti—Ni alloy, a Cu—Zn—Al alloy, a Ti—Ni—Fe alloy, a polyurethane polymer, etc.

Preferably, one of the arms has an engaging portion at its free end side while the other of the arms has an engaged portion at its free end side. Thus, the coupling of the engaging portion with the engaged portion connects the pair of arms, so that the screw attachment does not open with ease during a normal state. Thereby, the securing object is surely secured to the main fastening body. Meanwhile, the pair of arms can expand radially such that the screw attachment is released from the head of the fastening piece due to its shape restoring ability by heating or provision of an external force.

Preferably, the screw attachment is annular, and the engaging portion is radially positioned inside the engaged portion. Thus, the engaging portion abuts against the engaged portion such that they can disengage at disassembling of the object without an excessive engagement force due to fastening of the fastening piece. Accordingly, the pair of arms disengage from each other with ease, improving a disassembling process.

Preferably, the fastening piece is a flush head screw. Thus, heating of the screw attachment expands radially the pair of arms along an inclined surface of the screw head against securing force of the fastening piece, so that the screw attachment is released from the screw head. Accordingly, the securing object is automatically loosened.

Preferably, the pair of arms are made of a shape memory alloy at least partially. Thus, the pair of arms return in their original shapes by heating up to a temperature above a reverse transformation point so that the arms expand radially to release the screw attachment from the fastening piece. The fastening piece can give a larger fastening force, since the shape memory alloy provides a large restoring force. Accordingly, the securing object is surely secured to the main fastening body. Meanwhile, the securing object improves a disassembling process. For example, when the shape memory alloy is a Ti—Ni alloy, the arms change in structure from martensite to austenite to return in their original memorized shapes.

Preferably, the pair of arms are made of a high polymer at least partially. Thus, the pair of arms return in their original shapes by heating up to a temperature above a glass transformation point of the high polymer so that the arms expand radially to release the screw attachment from the fastening piece. Since the screw attachment is made of a polymer material, the securing object may be made of a material the same as the screw attachment. This is advantageous in disassembling and recycling of electric appliances. The polymer may be one of a polyurethane group.

Preferably, the pair of arms are made of a resilient material at least partially. Thus, the pair of arms return in their original shapes by a resilient restoring force of the material so that the arms expand radially to release the screw attachment from the fastening piece. The screw attachment having a small diameter can be easily produced with a low cost since the arms are made of the resilient material. The resilient material is a metal one such as an elastic steel rod (SUP6), a hard steel rod (SWB, SWC), and a piano wire (SWPA, SWPB), or the resilient material is made of a synthetic resin as a polycarbonate, a glass-fiber reinforcing plastic (GFRP), and a carbon-fiber reinforcing plastic (CFRP).

Preferably, the screw attachment has wave-like undulation in its outer surface opposed to an axial direction of the fastening piece. Thus, the fastening piece resiliently abuts against the undulation of the screw attachment, preventing loosing of the fastening piece. Accordingly, an increased fastening force surely secures the securing object to the main fastening body.

Preferably, the pair of arms each have a circular section. Thus, the arms can deform with ease because the circular section has a section modulus smaller than that of a rectangular section to provide a smaller resilient constant. Furthermore, the screw attachment having the arms can be easily formed by a bending process.

A third aspect of the invention is a fastening assembly comprising:

a main fastening body, a fastening piece screwed in the main fastening body, a securing object having a through hole to pass the fastening piece, and a screw attachment, wherein the screw attachment is one of the screw attachments described in the first aspect of the invention.

Thus, the screw attachment is sandwiched between the head of the fastening piece and the securing object while the securing object is opposed to the main fastening body. The fastening piece is inserted into a through hole of the securing object, and the fastening piece engages with the female thread of the main fastening body. The securing force of the fastening piece presses the securing object against the main fastening body via the screw attachment to secure the securing object. Then, the pair of arms return in their original shapes against the securing force by heating, so that the pair of arms move away form each other to expand outward radially. Thereby, the screw attachment is released from the head of the fastening piece to disengage the securing object from the main fastening body. Accordingly, an electric appliance provided with the fastening structure can be disassembled in a short time, improving a disassembling process of the appliance.

Preferably, the main fastening body has a vertical slot formed in an axial direction of the main fastening body and a lateral slot intersecting the vertical slot, and the fastening assembly has a nut that is removably inserted in the lateral slot. The nut engages with the fastening piece via threads in place of the internal thread formed in the main fastening body. Thus, after disengagement of the securing object from the main fastening body, the fastening piece is transferred laterally together with the nut to easily remove them from the main fastening body. Accordingly, the fastening piece can be removed from the main fastening body with ease, improving a disassembling process for recycling.

Preferably, a washer is disposed between the securing object and the screw attachment. Thus, the fastening piece bears stably on the washer to prevent loosening of the fastening piece, increasing the securing force of the fastening piece. Accordingly, a fastening process in an electric appliance can be surely performed.

Preferably, a compressed spring is disposed between the securing object and the main fastening body to resiliently press the securing object against the main fastening body. Thus, the resilient force of the compressed spring separates automatically the securing object from the main fastening body with disengagement of the screw attachment from the fastening piece. This enables automatic disassembling of an electrical appliance, improving a disassembling process of the appliance.

Preferably, the fastening piece has a neck that is formed with an engagement shoulder larger than the female thread in diameter, the engagement shoulder abutting against an end of the main fastening body.

The engagement shoulder of the fastening piece abuts against an end of the main fastening body with fastening of the fastening piece. This prevents the head of the fastening piece from forcing into the inside of the screw attachment. Thereby, the securing object is surely secured to the main fastening body without disengagement of the arms of the screw attachment. Thus, the screw attachment is prevented from disengaging undesirably from the head of the fastening piece during fastening of the fastening piece, improving the fastening process in reliability. Furthermore, the screw attachment returns in its original shape by heating it up to a predetermined temperature, improving the screw attachment for a disassembling process.

A fourth aspect of the invention is a disassembling process of a fastening assembly having the screw attachment that is one of those constructed as described above. The disassembling process includes the steps of:

heating the connection portion of the screw attachment to soften the connection portion, moving the pair of arms radially away from each other by heating or provision of an external force, removing the screw attachment from the head of the fastening piece, and separating the fastening piece from the main fastening body.

For example, the connection portion having a softening temperature lower than that of the arms is heated up to a temperature higher by 20 to 30° C. than a guarantee temperature of the securing object in a furnace or a hot water. Another heater may be used to heat the connection portion. Thereby, the connection portion softens to move the pair of arms radially away from each other by heating or provision of an external force, removing the screw attachment from the head of the fastening piece to separate the fastening piece from the main fastening body. Accordingly, disengagement of the fastening piece requires less time, providing an easy disassembling process.

A fifth aspect of the invention is a disassembling process of a fastening assembly having the screw attachment that is one of those constructed as described above. The disassembling process comprises the steps of:

heating the pair of arms, moving the pair of arms radially away from each other by utilizing the shape restoring ability, removing the screw attachment from the head of the fastening piece, and separating the fastening piece from the main fastening body.

The pair of arms are heated up to a temperature higher than a shape transformation temperature of the securing object in a furnace, in a hot water, or by another heater. Or, the pair of arms are provided with a force causing stress-induced transformation of the arms. Thereby, the pair of arms come away from each other to define a clearance therebetween, removing the screw attachment from the head of the fastening piece to separate the securing object from the main fastening body. Accordingly, disengagement of the fastening piece requires less time, providing an efficient disassembling process.

DETAILED DESCRIPTION OF THE PREFERRED EMBODIMENTS

Embodiments of the present invention will be discussed hereinafter. FIGS. 1 to 5 show a first embodiment of a screw attachment, a fastening assembly having the screw attachment, and process of releasing the fastening assembly according to the present invention.

Figure 1:
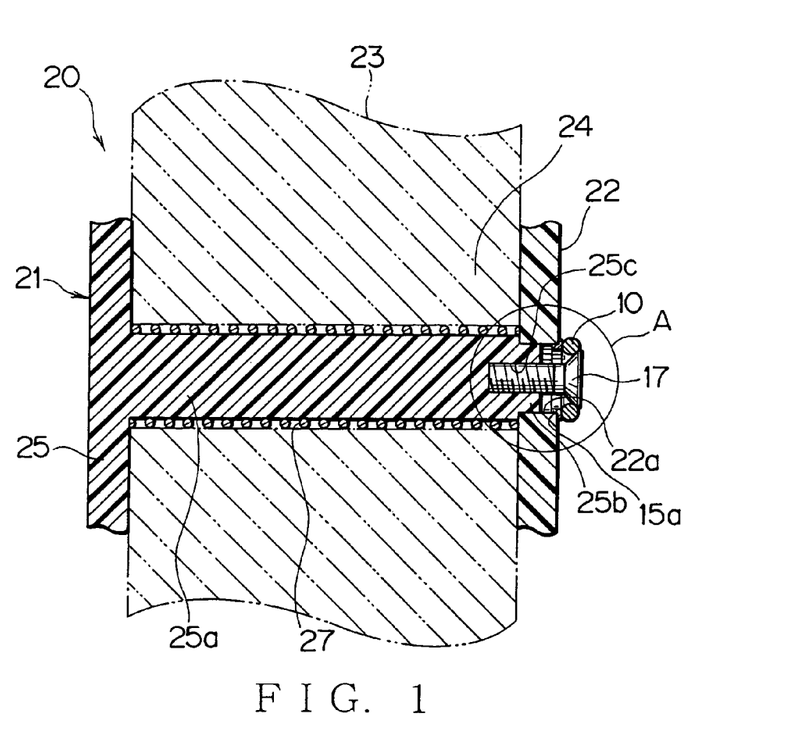
FIG. 1 shows a first embodiment of a screw attachment and a fastening assembly utilizing the screw attachment according to the present invention.

FIG. 1 shows partially a liquid-crystal television 20 to discuss an example of a fastening assembly. The fastening assembly employs a spacer (screw attachment) 10 made of a shape memory alloy for an easy disassembling process. The liquid-crystal television 20 has a plastic chassis 21 to receive a box, a liquid crystal panel body 23, lamps (not shown), sheets (not shown), etc. The chassis 21 consists of a panel case 25 and a panel cover (securing object) 22 covering an opening of the liquid crystal panel body 23. The liquid crystal panel body 23 has a pair of fore and rear glass plates, a liquid crystal sheet, a deflection plate, a reflection plate, an electronic circuit unit, etc. The liquid crystal panel body 23 is sandwiched between the panel case 25 and the panel cover 22 to be secured inside the panel case 25.

The shape memory material is, for example, a Ti—Ni alloy or a CU—Zn—Al alloy, which has a characteristic to return in a memorized shape by application of heat or force (stress). The shape memory alloy may have a characteristic of super elasticity, vibration damping, or anticorrosion. The shape memory alloy includes an alloy having super elasticity.

A process to provide a shape memory alloy is dependent on its composition and its application. Generally, during the process, the alloy is held, for example, at 400 to 800° in atmospheric air, a vacuum, or an inert gas for 5 to 60 minutes to obtain a shape memory ability. A spacer according to the present invention is held at 750° C. in atmospheric air for 10 minutes to obtain a shape memory ability.

A shape memory alloy has a reverse transformation temperature to return in a memorized shape by structure transformation, and the transformation temperature is greatly dependent on its composition and elements. For example, a Ti-50 Ni alloy has a reverse transformation temperature of 78° C., and a spacer according to the present invention to be used for the liquid-crystal television 20 has a reverse transformation temperature of about 100° C.

The spacer 10 of the embodiment is used together with a screw (fastening piece) 17 for assembling an electric appliance like the liquid crystal television 20. The spacer 10 keeps a required fastening force of the screw 17. Meanwhile, the spacer 10 serves to disassemble the electric appliance with ease. An elongated member made of a shape memory material is bent to define the spacer 10 having a pair of arms 12 and 13. The spacer 10 is sandwiched between a head 17b of the screw 17 and the panel cover 22 around the screw 17. One 12 of the arms has an engagement portion 12a at its fore end while the other arm 13 has an engagement portion 13a at its fore end. The engagement portion 12a mates with the engagement portion 13a so that the arms 12 and 13 connect together to define a ring. The screw 17 and the ring fasten the panel cover 22 to the panel case 25. Meanwhile, heating of the engagement portions 12a and 13a having been engaged with each other returns the ring to an original shape memorized by the shape memory ability. Thereby, the pair of arms 12 and 13 disengage from each other to expand radially relative to the screw 17 to be released from the head 17b of the screw 17.

In the present invention, the material of the arms 12 and 13 is not limited in shape memory alloys. The arms 12, 13 may be made of a polymer of a polyurethane group or may be made of a resilient material such as an elastic steel rod (SUP6), a hard steel rod (SWB, SWC), and a piano wire (SWPA, SWPB). The resilient material may be made of a synthetic resin such as a polycarbonate, a glass-fiber reinforcing plastic (GFRP), and a carbon-fiber reinforcing plastic (CFRP), or a composite thereof.

When the arms 12, 13 are made of a shape memory alloy of a Ti—Ni alloy, the arms 12, 13 change in structure from martensite to austenite to return in their original memorized shapes by heating. When the arms 12, 13 are made of a high polymer material, the pair of arms 12, 13 return in their original shapes by heating at a temperature above a glass transformation point of the high polymer. When the arms 12, 13 are made of a elastic material, the pair of arms 12, 13 having been connected to define a ring return in their original shapes by resilient restoring ability of the elastic material. When the arms 12, 13 are made of a super elastic alloy of a Ti—Ni alloy, the arms 12, 13 change in structure from martensite to austenite to return to their original memorized shapes by an external force.

Figure 19:
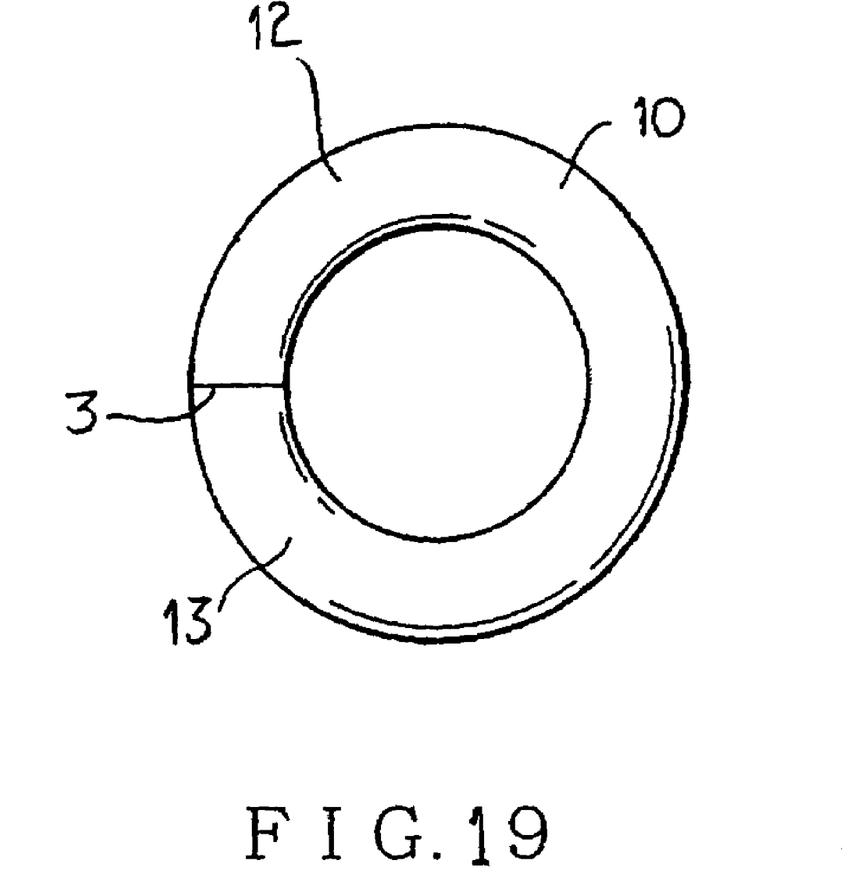
FIG. 19 shows a sixth example of a screw attachment according to the present invention.

In place of engagement of the portions 12a, 13a of the arms 12, 13, the pair of arms 12, 13 may be connected by soldering or by a hot-melt adhesive. For example, solder or hot-melt adhesive can be used at interface 3 (FIG. 19) between arms 12 and 13. A soldering material is, for example, a solder of Sn—Bi, Sn—In, or the like and has a low melting temperature. A hot melt adhesive is made of, for example, a polymer of a polyurethane group and has a low melting point. Heating the joining portion up to 100 to 200□ melts or softens the solder or the adhesive to disengage the arms 12, 13 from each other.

Another embodiment of the invention is a fastening assembly utilizing the spacer 10. The pair of arms 12, 13 of the spacer 10 expand radially relative to the screw 17 when heated, so that the spacer 10 is released from the head 17b of the screw 17. The fastening assembly has a panel case 25, a panel cover 22 with a through hole 22a, and the screw 17 engages with the panel case 25 via the through hole 22a. The panel cover 22 covers an opening of the liquid crystal panel body 23, and the screw 17 engages with an internal thread 25c of the panel case 25. The spacer 10 is sandwiched between the head 17b of the screw 17 and the panel cover 22, and a fastening force of the screw 17 secures the panel cover 22 to the panel case 25.

Next, the spacer 10, the fastening assembly having the spacer 10, and a process of releasing the fastening assembly according to the present invention will be discussed in detail. As shown in FIG. 1, the panel case 25 composing the chassis 21 is disposed to be opposed to the panel cover 22 to position the liquid-crystal television 20 therebetween. The panel case 25 and the panel cover 22 are made of a synthetic resin material and formed by injection molding. In the present invention, at least one of the panel case 25 and the panel cover 22 may be made of a metal.

The panel case 25 is a box having an opening. The panel case 25 has a space 24 accommodating a liquid crystal panel body 23. The panel case 25 unitarily has a plurality of main fastening bodies 25a (one of them is illustrated) extended toward the panel cover 22. The main fastening body 25a is formed with a reduced diameter projection 25b at its fore end, and the reduced diameter projection 25b engages with the through hole 22a of the panel cover 22. The main fastening body 25a has a length corresponding to a width of the liquid crystal panel body 23. The fore end of the main fastening body 25a is formed with the internal thread 25c engaged with an external thread 17a of the screw 17.

Around the main fastening body 25a, a compressed coil spring 27 is arranged. The compressed coil spring 27 has a length larger than that of the main fastening body 25a, so that the compressed coil spring 27 extends over a fore end of the main fastening body 25a. The extended part of the compressed coil spring 27 is compressed by the panel cover 22 attached to the panel case 25. Thereby, both the panel case 25 and the panel cover 22 receive a resilient force from the compressed coil spring 27.

The compressed coil spring 27 may be deleted in the present invention. However, the compressed coil spring 27 is advantageous, because resiliency of the compressed coil spring 27 can automatically separate the panel cover 22 from the panel case 25 on disengagement of the spacer 10 from the screw 17.

The main fastening body 25a is formed unitarily with the panel case 25 and may have a length not to project from the liquid crystal panel body 23.

The panel cover 22 is a plate disposed to partially cover of the liquid crystal panel body 23. The panel cover 22 is arranged to be opposed to the main fastening body 25a and has a plurality of through holes 22a (one through hole 22a is illustrated) each passing the compressed coil spring 27. The through hole 22a has a diameter corresponding to the reduced diameter projection 25b of the main fastening body 25a. The reduced diameter projection 25b engages with an inner side of the through hole 22a, and a specified seat ring 15 engages with an outer side of the through hole 22a.

In the specification, a longitudinal direction is defined to be a left or right direction in FIG. 1, and a forward area is a side where the panel case 25 is positioned while a rear area is a side where the panel cover 22 is positioned.

The screw 17 (FIG. 2) is a flush head screw having an external thread 17a in one side and a head 17b in the other side. The screw 17 has a size selected based on its application. In this embodiment, the screw 17 is of M4 type (about 4 mm diameter). Provision of a flush head screw is a feature of the present invention. Heating of the spacer 10 expands radially the pair of arms 12, 13 along an inclined surface of a seating surface 17c, so that the arms 12, 13 are released from the head 17b of the screw 17 against a contact pressure of the screw 17. This eliminates a removal process with a screw driver for a lot of the screws 17, improving a disassembling process of an electric appliance.

Figure 4A:
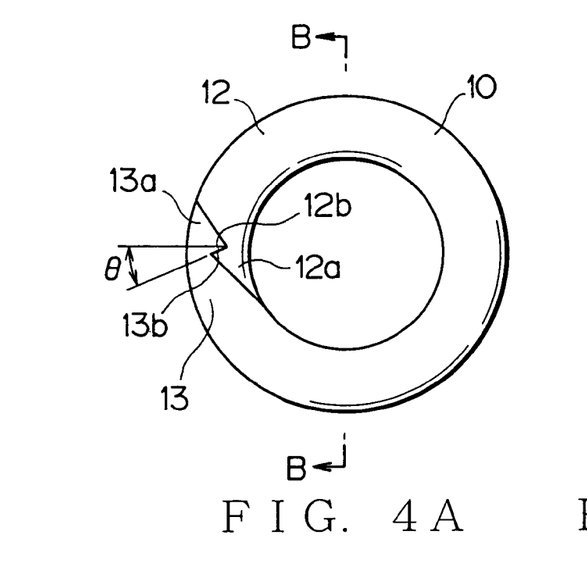
FIGS. 4A and 4B are enlarged views showing the screw attachment of FIG. 1, FIG. 4A being a plan view, FIG. 4B being a sectional view taken along line B-B of FIG. 4A.
Figure 4B:
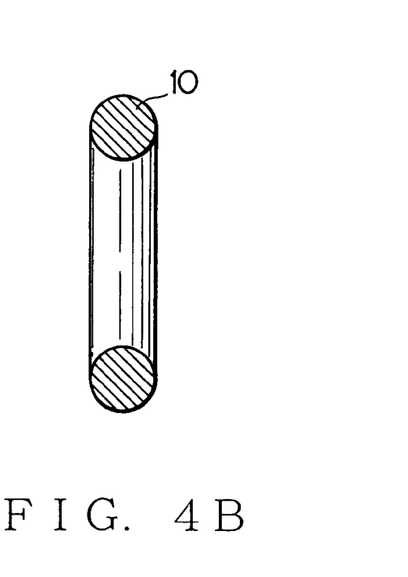

As illustrated in FIGS. 4A and 4B, the spacer 10 is defined by bending a bar made of a shape memory alloy in a circular shape and connecting free ends of the bar. One arm 12 of the spacer 10 has an engagement portion 12a at its fore end while the other arm 13 has an engagement portion 13a at its fore end. The engagement portion 12a is positioned radially in an inner side of the arm 12 while the engagement portion 13a is positioned radially in an outer side of the arm 13. The engagement of the inner engagement portion 12a and the outer engagement portion 13a is advantageous for expanding the arms radially when the arms 12, 13 disengage from each other. Because, an excessive engagement force is prevented even due to a fastening force of the screw 17 between the head 17b of the screw 17 and the panel cover 22.

The engagement portion 12a and the engagement portion 13a each are defined in a lance having an engagement surface 12b or 13b. Each engagement surface 12b or 13b is an inclined surface having an angle θ. The inclined direction intersects a circumferential direction and a radial direction of the spacer 10.

The engagement of the engagement portion 12a with the engagement portion 13a connects the arms 12, 13 to each other such that the pair of arms 12, 13 can keep their engagement against fastening of the screw 17 with a given torque to prevent loosening of the screw 17. This surely secures the panel cover 22 to the panel case 25.

Figure 5:
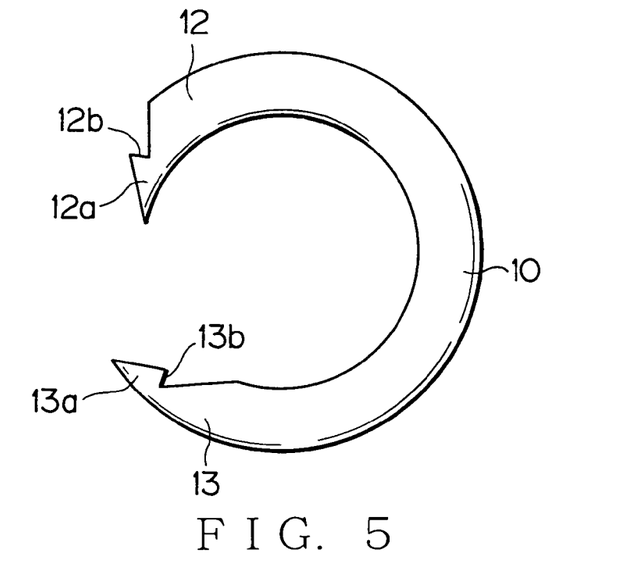
FIG. 5 is a plan view showing a memorized shape of the screw attachment.

The inclined surfaces 12b, 13b of the engagement portions 12a, 13a prevent an excessive engagement force of the pair of arms 12, 13. This is advantageous for disengagement of the arms due to a radial and circumferential restoring force when the spacer 10 is heated. FIG. 5 shows a disengaged state of the arms. The releasing of the spacer 10 from the screw 17 enables disassembling of the plastic chassis 21 with ease.

The pair of arms 12, 13 of the spacer 10 each have a circular section. Thus, the arms 12, 13 can deform with ease because the circular section has a section modulus smaller than that of a rectangular section to provide a smaller resilient constant. Furthermore, the spacer 10 can be easily formed by a bending process in a circular shape. Moreover, the seating surface 17c of the flush head screw 17 engages with the spacer 10 in line contact to decrease friction therebetween, allowing easy releasing of the spacer 10 from the screw 17, improving a disassembling process of the liquid-crystal television 20.

Figure 6A:
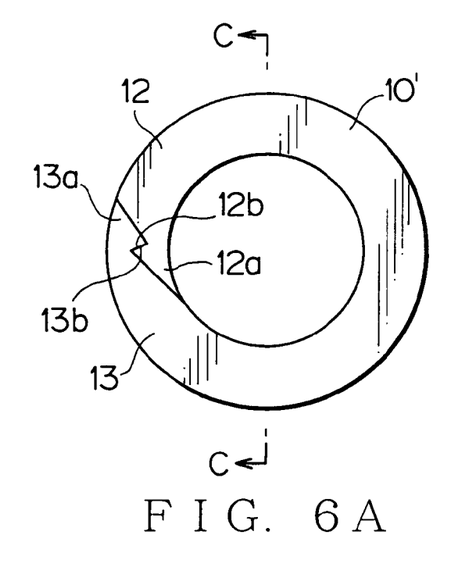
FIGS. 6A and 6B show another example of the screw attachment of FIG. 1, FIG. 6A being a plan view, FIG. 6B being a sectional view taken along line C-C of FIG. 6A.
Figure 6B:
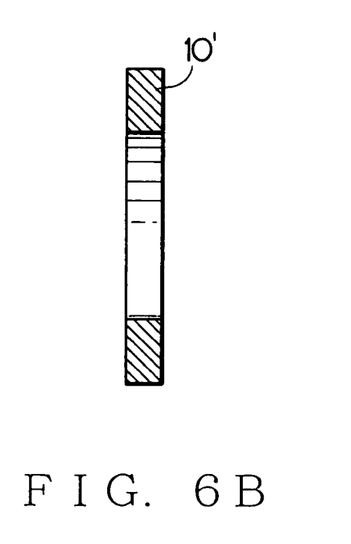

In FIGS. 6A and 6B, another spacer 10' has a pair of arms 12, 13 with a rectangular section. The rectangular section provides a larger resilient constant to increase a breaking strength of the spacer 10'. The spacer 10' is effective for a securing screw or a bolt having an engagement surface perpendicular to its axial direction to allow stable seating of the spacer 10'.

Figure 7A:
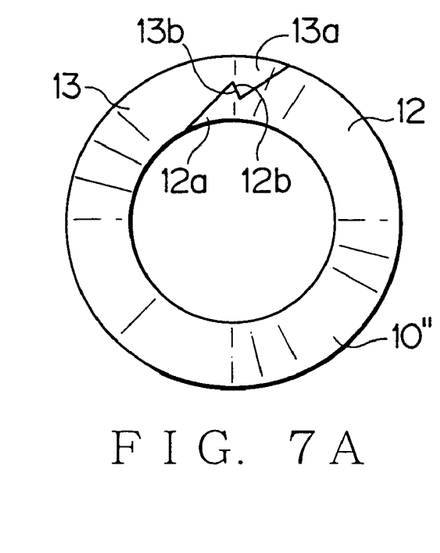
FIGS. 7A and 7B show another example of the screw attachment of FIG. 1, FIG. 7A being a plan view, FIG. 7B being a side view.
Figure 7B:
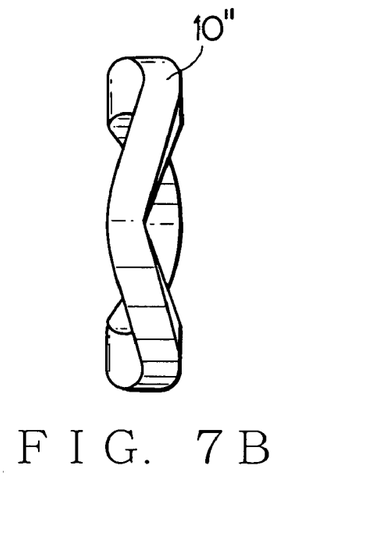

In FIGS. 7A and 7B, further another spacer 10" is shown, which is twisted in its circumferential direction to have a wave shape. The spacer 10" has a resiliency which keeps a reliable fastening force to prevent unintentional loosening and disengagement of a screw 17.

Figure 2:
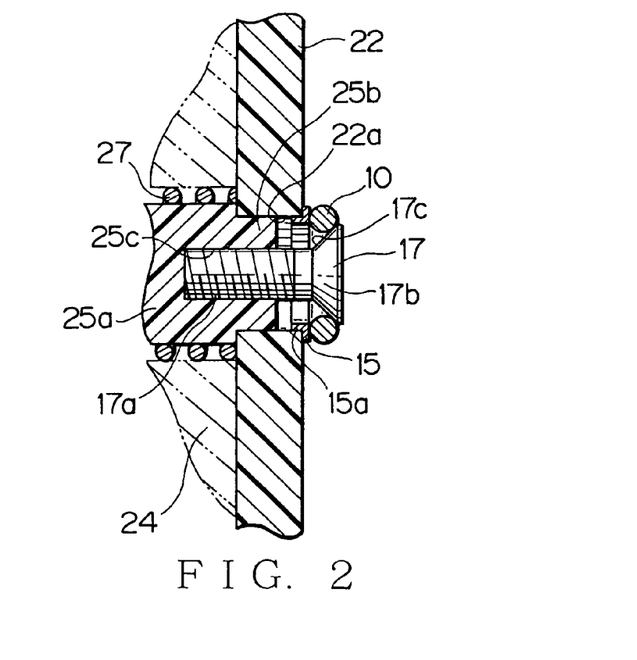
FIG. 2 is an enlarged sectional view showing an encircled part A of FIG. 1.

As shown in FIG. 2, a specified seat ring 15 is disposed between the spacer 10 and the panel case 25. The seat ring 15 has a flange 15a perpendicularly depended. The flange 15a engages with an inner periphery of the through hole 22a to prevent deviation of the seat ring 15. The seat ring 15 provides a stable seat for the screw 17 to obtain a reliable fastening force. This prevents loosening of the screw 17 to surely secure the panel cover 22 to the panel case 25.

Next, assembling and disassembling steps of the chassis 21 of the liquid-crystal television 20 will be discussed sequentially. The compressed coil spring 27 is received around the main fastening body 25a of the panel case 25 while the panel case 25 is opposed to the panel cover 22. At the same time, the liquid crystal panel body 23 is received in the space 24 of the panel case 25. Then, with compressing of the coil spring 27, the reduced diameter projection 25b of the main fastening body 25a is engaged with the through hole 22a of the panel case 25. The seat ring 15 is engaged with the through hole 22a of the panel case 25, and the spacer 10 is put on the seat ring 15. The screw 17 is inserted through the seat ring 15 and the spacer 10. The external thread 17a of the screw 17 engages with an internal thread 25c formed in the main fastening body 25a of the panel case 25 to fasten the screw 17 with a given torque. The torque is managed to be a constant value in an actual as step.

Fastening of the screw 17 abuts the seating surface 17c of the screw 17 against the spacer 10. The spacer 10 receives a force to disengage the pair of arms 12, 13 from each other. However, since the arms 12, 13 are joined by the engagement portions, the arms 12, 13 are not disengaged. Thus, a further advancement of the screw 17 to expand the spacer 10 is prevented, and loosening of the screw 17 is also prevented.

The fastening force of the screw 17 presses the panel cover 22 via the spacer 10 and the seat ring 15 to assemble the chassis 21.

Figure 3:
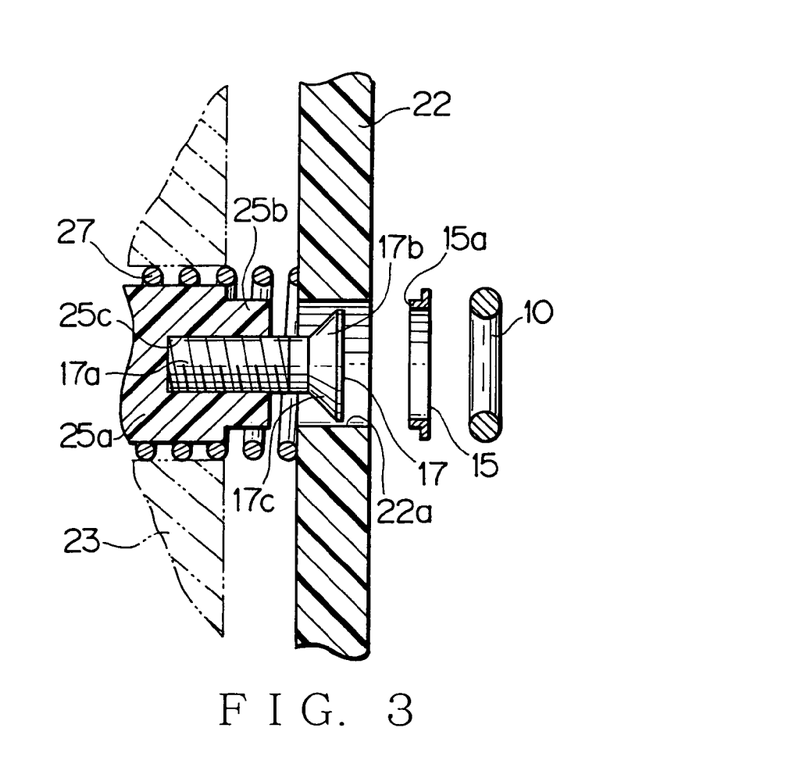
FIG. 3 is a sectional view showing an exploded state of the fastening assembly of FIG. 1.

Next, steps of disassembling of the plastic chassis 21 for recycling of the electric appliance will be discussed. The plastic chassis 21 is heated in a furnace or in an oil at a temperature of 110° C. for several seconds. Thereby, the spacer 10 is heated to return in its memorized shape, so that the pair of arms 12, 13 disengage from each other. Thus, the spacer 10 is released from the screw 17, and the resilient force of the compressed coil spring 27 automatically separates the panel cover 22 from the panel case 25. That is, the plastic chassis 21 is easily disassembled (FIG. 3).

The heating temperature of 110° C. is applied to disassemble the chassis 21 of the liquid-crystal television 20. Generally, a heating temperature for disassembling of an electric appliance is higher by 20 to 30° C. than a guarantee temperature (temperature in use) of the appliance. When the heating temperature is lower than 100° C., a hot water may be used for heating the appliance. The liquid-crystal television 20 may be locally heated by induction current or by another heat source.

Thus, the first embodiment can effectively assemble the plastic chassis 21 with a fastening torque managed in an actual assembling process. The chassis 21 can be easily disassembled by soaking it in a hot water for several seconds.

Figure 8A:
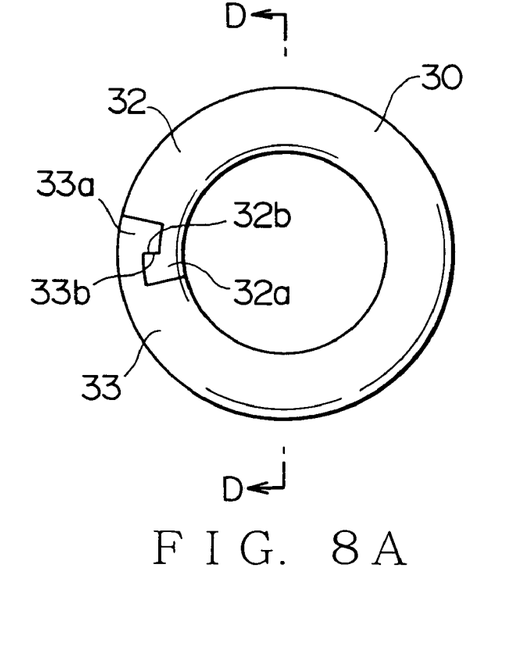
FIGS. 8A and 8B show a second example of a screw attachment according to the present invention, FIG. 8A being a plan view, FIG. 8B being a sectional view taken along line D-D of FIG. 8A.
Figure 8B:
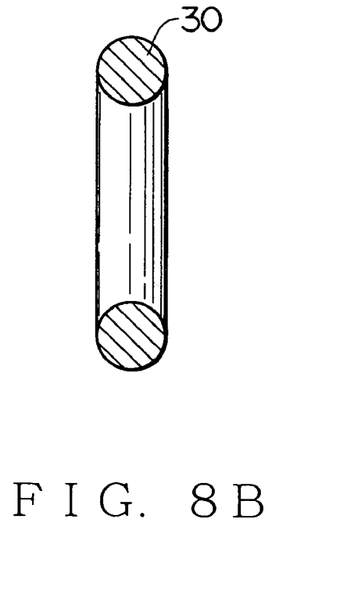

Next, referring to FIGS. 8A and 8B, a second example of a spacer (screw attachment) according to the present invention will be discussed. In the second example, a spacer 30 has a pair of arms 32, 33 each formed with a locking portions 32a or 33a. Each of the locking portions 32a and 33a is defined in a hatchet shape and has a stopping surface 32b or 33b. The stopping surfaces 32b and 33b are vertical surfaces perpendicular to circumferential direction of the spacer 30, which is different from the spacer 10 of the first example. The vertical surfaces 32b, 33b allow an increased engagement force to provide a larger fastening force of the screw 17. Thus, the chassis 21 is surely assembled by the fastening process. In a test model, it was confirmed that a flush head screw of M4 is fastened with a torque of 1.5 Nm (newton-meter) without disengagement of the arms. The plastic chassis 21 is easily disassembled in the same way as the first example by putting the chassis 21 in a heated furnace, a hot oil, or a hot water.

Figure 9A:
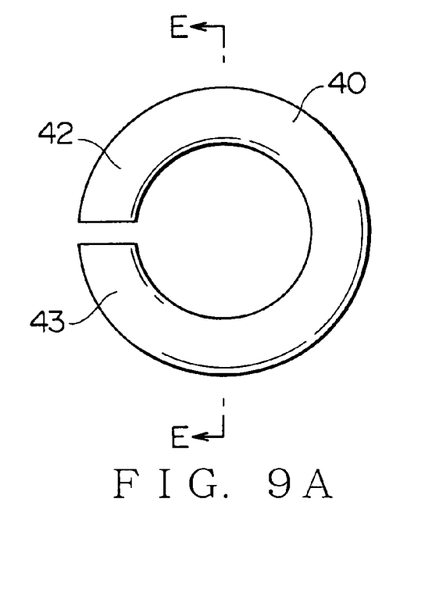
FIGS. 9A and 9B show a third example of a screw attachment according to the present invention, FIG. 9A being a plan view, FIG. 9B being a sectional view taken along line E-E of FIG. 9A.
Figure 9B:
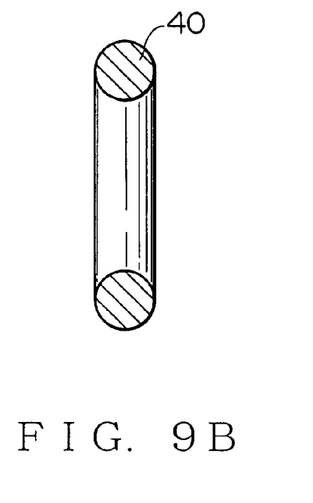

Next, referring to FIG. 9, a third example of a spacer (screw attachment) according to the present invention will be discussed. In the third example, a spacer 40 has a pair of arms 42, 43 that are not engaged with each other to have free ends, which is different from the spacer 10 of the first example. The free ends of the arms 42, 43 provide no resisting force against a restoring force of the arms 42, 43 in a disassembling step of the liquid-crystal television 20. Thus, the pair of arms 42, 43 of the spacer 40 open with ease, improving a disassembling process.

Figure 10A:
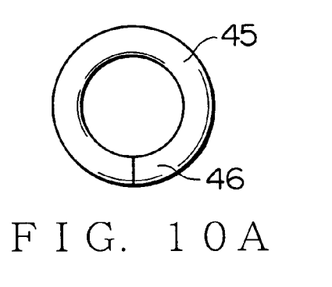
FIGS. 10A and 10B show a fourth example of a screw attachment according to the present invention, FIG. 10A being a plan view, FIG. 10B being a side view.
Figure 10B:
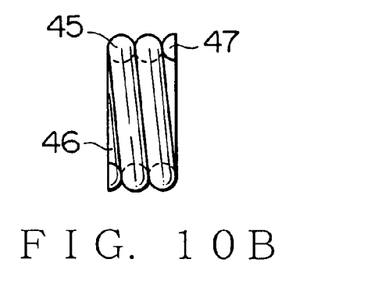

Next, referring to FIGS. 10A and 10B, a fourth example of a spacer (screw attachment) according to the present invention will be discussed. In the fourth example, a spacer 45 is a coiled bar having a round section and has a pair of arms 46, 47 that are not engaged with each other to have free ends, which is different from the spacer 10 of the first example. The coiled spacer 45 prevents opening of the arms 46, 47 and forcible advancing of the screw 17 into the spacer 45 when the screw 17 is fastened. This can secure the panel cover 22 to the panel case 25. The coiled spacer 45 has clockwise windings as corresponding to a right hand screw while the coiled spacer 45 has counterclockwise windings as corresponding to a left hand screw. This allows that fastening of the screw 17 serves to further prevent opening of the arms 46, 47. The spacer 45 has top and bottom surfaces which are flat to bear the screw 17 stably. The windings of the spacer 45 may be one or not less than three.

Figure 11A:
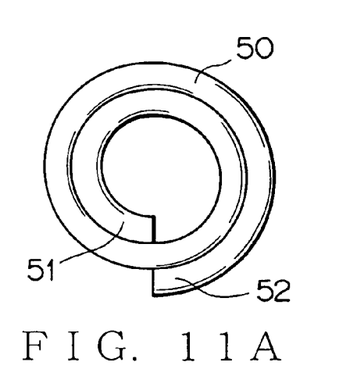
FIGS. 11A and 11B show a fifth example of a screw attachment according to the present invention, FIG. 11A being a plan view, FIG. 11B being a side view.
Figure 11B:
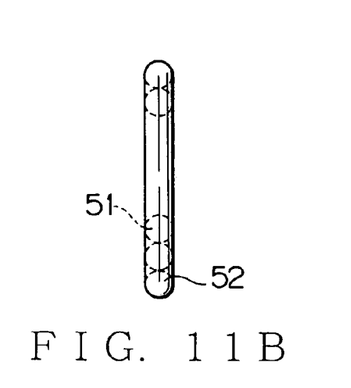

Next, referring to FIGS. 11A and 11B, a fifth example of a spacer (screw attachment) according to the present invention will be discussed. In the fifth example, a spacer 50 is a spiral winding rod having a round section and has a pair of arms 51, 52 that are not engaged with each other to have free ends, which is different from the spacer 10 of the first example. It is the same as the third and fourth examples that the arms 51,52 have the free ends. Like the spacer 45 of the fourth example, the spiral spacer 50 has clockwise windings as corresponding to a right hand screw while the spiral spacer 50 has counter-clockwise windings as corresponding to a left hand screw. The spiral spacer 50 has a resilient energy proportional to the winding number of the rod. The spiral spacer 50 prevents opening of the arms 51, 52 and forcible advancing of the screw 17 into the spacer 50 when the screw 17 is fastened.

One arm 51 is positioned in an inner side of the spacer 50 while the other arm 52 is positioned in an outer side of the spacer 50. The outer arm 52 is located outside the head 17*b* of the screw 17. Thus, the outer arm 52 is not pinched between the head 17*b* of the screw 17 and the panel cover 22, so that the 52 easily returns to its original shape to release the spacer 50 from the screw 17 in a disassembling step.

Figure 12:
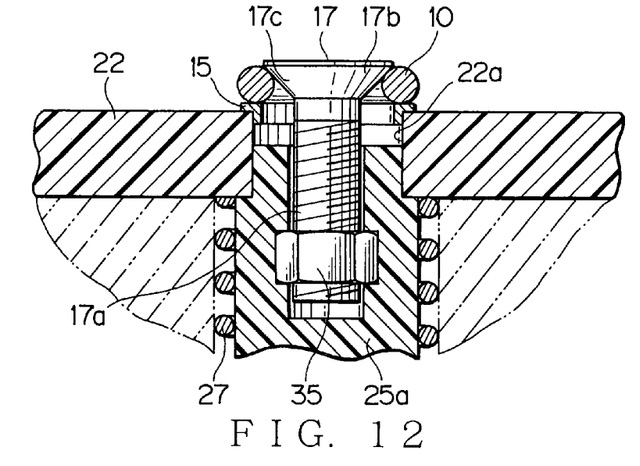
FIG. 12 is a sectional view showing a second embodiment of a fastening assembly having a screw attachment according to the present invention.
Figure 13A:
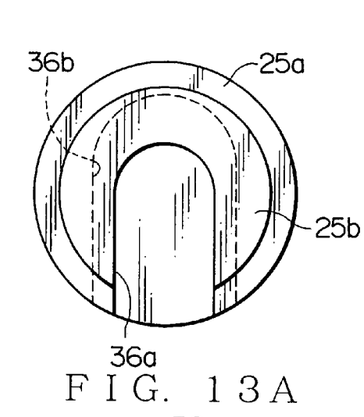
FIGS. 13A and 13B show a fastening piece of the fastening assembly of FIG. 12, FIG. 13A being a plan view, FIG. 13B being a front view.
Figure 13B:
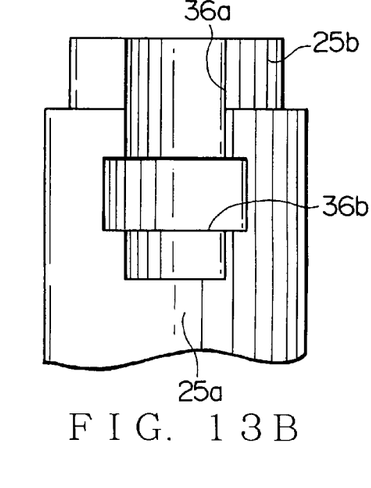
Figure 14A:
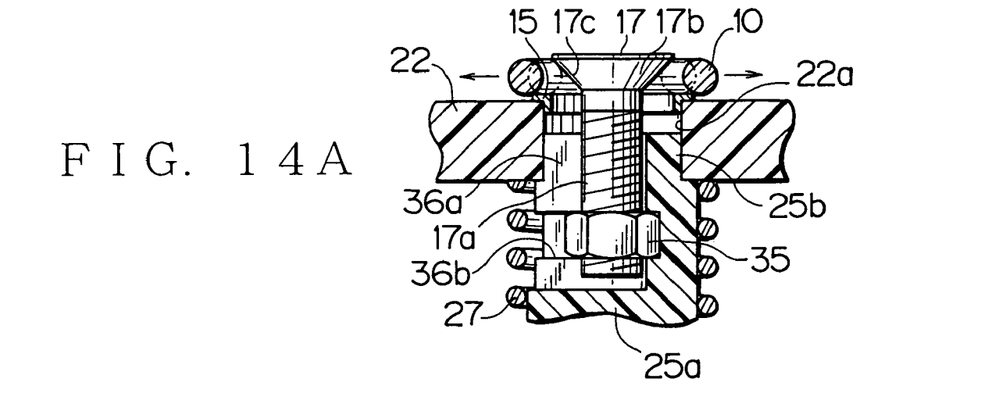
FIGS. 14A, 14B, and 14C show steps for disassembling of the fastening assembly of FIG. 12, FIG. 14A being a sectional view showing a state where a screw attachment is open to be in its original shape, FIG. 14B being a sectional view showing a state where a fastening piece is pressed by a coiled spring with the screw attachment released from a screw head, FIG. 14C being a sectional view showing a state where the screw attachment is removed from a main fastening body together with a nut.
Figure 14B:
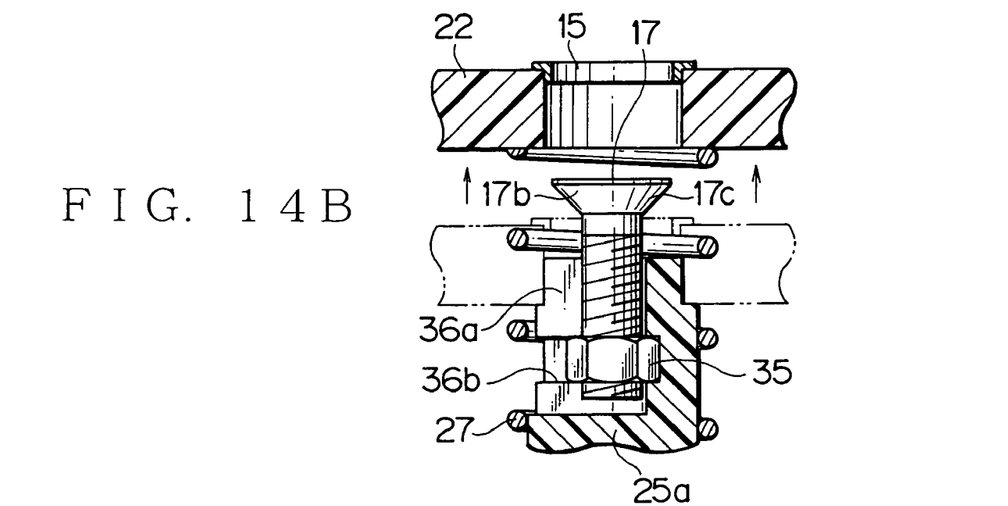
Figure 14C:
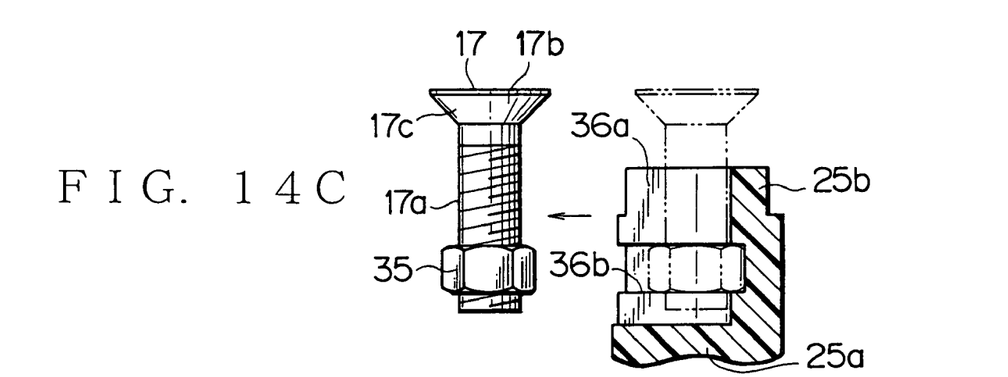

Next, referring to FIGS. 12 to 14, a second embodiment of a fastening assembly according to the present invention will be discussed. In this embodiment, the same reference numeral as the first embodiment designates the same component as that of the first embodiment. It is different from fastening assembly of the first embodiment that a nut 35 is removably inserted into the main fastening body 25*a* of the panel case 25 shown in FIGS. 1 and 2.

The main fastening body 25*a* is formed with a vertical slot 36*a* and a lateral slot 36*b* in its fore end side. The vertical slot 36*a* receives the screw 17 in an axial direction of the main fastening body 25*a*. The lateral slot 36*b* intersects the vertical slot 36*a* perpendicularly to the vertical slot 36*a* and receives a nut 35 engaging with the external thread 17*a* of the screw 17. The vertical slot 36*a* is a cutout directed radially from an outer periphery toward a center of the main fastening body 25*a*. The vertical slot 36*a* has a width slightly larger than an outer diameter of the external thread 17*a* of the screw 17 and a depth longer than the external thread 17*a*.

The lateral slot 36*b* is positioned in a lower side of the vertical slot 36*a* and has a width slightly larger than that of the nut 35. The lateral slot 36*b* has a depth slightly larger than a height of the nut 35. The nut 35 axially aligns with the main fastening body 25*a* to engage with the external thread 17*a*.

For securing the panel cover 22 to the panel case 25, the spacer 10 is positioned between the screw 17 and the panel cover 22 in the same way as the first embodiment. Then, the screw 17 is inserted into the vertical slot 36*a* to engage with the nut 35. Thereby, the panel cover 22 is pressed on the seating surface 17*c* of the screw 17 via the spacer 10 to be secured thereon.

In removal of the panel cover 22, the liquid-crystal television 20 is put in a furnace, an oil, or a hot water. As shown in FIG. 14A, the spacer 10 opens in a radial direction of the screw 17 to be released from the head 17*b* of the screw 17. Thereby, resiliency of the compressed coil spring 27 disengages the panel cover 22 from the panel case 25 as shown in FIG. 14B. In FIG. 12, the screw 17 and the nut 35 are removed in a direction perpendicular to the section shown therein.

In this embodiment, after disengagement of the panel cover 22 from the panel case 25, the screw 17 having been engaged with the nut 35 is moved laterally to easily remove the screw 17 from the panel case 25. It takes little time to remove the screw 17, improving a process for disassembling.

In the first and second embodiments of the fastening assembly, the compressed coil spring 27 is provided to automatically disengage the panel cover 22 from the panel case 25. However, even without the compressed coil spring 27, the chassis 21 can be disassembled with ease.

The present invention is not limited in the embodiment described above but may be modified. For example, the flush head screw may be replaced by a screw (fastener) 55 having a neck with a stopping shoulder 55*d* as shown in FIG. 15.

Figure 15:
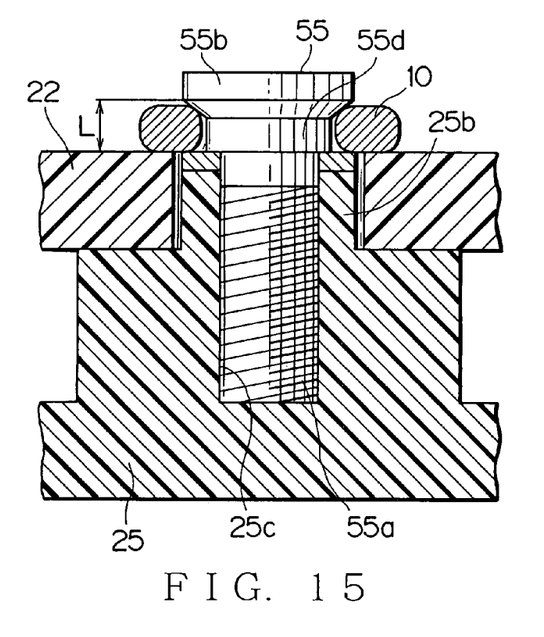
FIG. 15 is a sectional view showing a screw modified to have a shoulder.

In FIG. 15, the stopping shoulder 55*d* is located between a flush head 55*b* and an external thread 55*a*. The stopping shoulder 55*d* has an outer diameter larger than that of the external thread 55*a* and smaller than that of the head 55*b*. The stopping shoulder 55*d* has an end surface abutting against the reduced diameter projection 25*b* via a bearing plate to stop the screw 55. Thus, the screw 55 provides a constant neck length L regardless of a fastening torque of the screw 55. That is, in the fastening assembly having the spacer 10, the screw 55 prevents an excessive advancement of the screw head 55*b* into the spacer 10.

Thus, an unintentional opening movement of the spacer 10 is prevented so that the screw 55 does not disengage from the spacer 10, improving assembling and fastening processes in reliability. Furthermore, the spacer 10 can return in its original shape under a heated state, improving a disassembling process of the electric appliance.

What is claimed is:

1. A fastening assembly having a screw attachment adapted to be disposed around a fastening piece secured to a main fastening body and sandwiched between a head of the fastening piece and a securing object so that the screw attachment bears a securing force of the fastening piece to press the securing object, the screw attachment comprising:

a pair of radially expandable arms made of a shape restoring material and forming a ring having an inner diameter and an outer diameter, below a reverse transformation temperature of the shape restoring material, said pair of radially expandable arms having a securing force bearing shape with the inner diameter of the ring being smaller than an outer diameter of the head of the fastening piece and, at and above the reverse transformation temperature of the shape restoring material said pair of radially expandable arms having a restored shape with the inner diameter of the ring being larger than the outer diameter of the head of the fastening piece wherein said fastening piece has an inclined seating surface;

the fastening assembly comprising:

a main fastening body, a fastening piece screwed in the main fastening body, and a securing object having a through hole to pass the fastening piece, wherein the main fastening body has an internal thread engaged with the fastening piece, and a seat ring is disposed between the securing object and the screw attachment.

2. A fastening assembly having a screw attachment adapted to be disposed around a fastening piece secured to a main fastening body and sandwiched between a head of the fastening piece and a securing object so that the screw attachment bears a securing force of the fastening piece to press the securing object, the screw attachment comprising:

a pair of radially expandable arms made of a shape restoring material and forming a ring having an inner diameter and an outer diameter, below a reverse transformation temperature of the shape restoring material, said pair of radially expandable arms having a securing force bearing shape with the inner diameter of the ring being smaller than an outer diameter of the head of the fastening piece and, at and above the reverse transformation temperature of the shape restoring material, said pair of radially expandable arms having a restored shape with the inner diameter of the ring being larger than the outer diameter of the head of the fastening piece, wherein
said fastening piece has an inclined seating surface;
the fastening assembly comprising:

a main fastening body,
a fastening piece screwed in the main fastening body, and
a securing object having a through hole to pass the fastening piece, wherein
the main fastening body has an internal thread engaged with the fastening piece, and
a compressed spring is disposed between the securing object and the main fastening body to resiliently press the securing object against the main fastening body.

* * * * *